United States Patent [19]

Johnson et al.

[11] 4,032,400

[45] June 28, 1977

[54] NUCLEAR REACTOR FUEL ELEMENT WITH VANADIUM GETTER ON CLADDING

[75] Inventors: Carl E. Johnson, Elk Grove Village; Kenneth G. Carroll, La Grange, both of Ill.

[73] Assignee: The United States of America as represented by the United States Energy Research and Development Administration, Washington, D.C.

[22] Filed: Feb. 17, 1976

[21] Appl. No.: 658,805

[52] U.S. Cl. .................................. 176/67; 176/82; 252/181.6

[51] Int. Cl.² .......................................... G21C 3/06

[58] Field of Search ..................... 176/67, 68, 82; 252/181.6; 29/188

[56] References Cited

UNITED STATES PATENTS

| 3,088,892 | 5/1963 | Cain, Jr. et al. | 204/154.2 |
| 3,212,988 | 10/1965 | Ringot | 176/67 |
| 3,288,036 | 11/1966 | Staubwasser | 117/130 |
| 3,342,692 | 9/1967 | Bourrasse et al. | 176/68 |
| 3,347,749 | 10/1967 | Jordan | 176/69 |
| 3,427,222 | 2/1969 | Biancheria et al. | 176/68 |
| 3,850,584 | 11/1974 | Böhm et al. | 176/82 X |
| 3,940,312 | 2/1976 | Van Lierde | 176/67 |

Primary Examiner—Peter A. Nelson
Attorney, Agent, or Firm—Dean E. Carlson; Frank H. Jackson; James W. Weinberger

[57] ABSTRACT

A nuclear reactor fuel element is described which has an outer cladding, a central core of fissionable or mixed fissionable and fertile fuel material and a layer of vanadium as an oxygen getter on the inner surface of the cladding. The vanadium reacts with oxygen released by the fissionable material during irradiation of the core to prevent the oxygen from reacting with and corroding the cladding. Also described is a method for coating the inner surface of small diameter tubes of cladding with a layer of vanadium.

5 Claims, 1 Drawing Figure

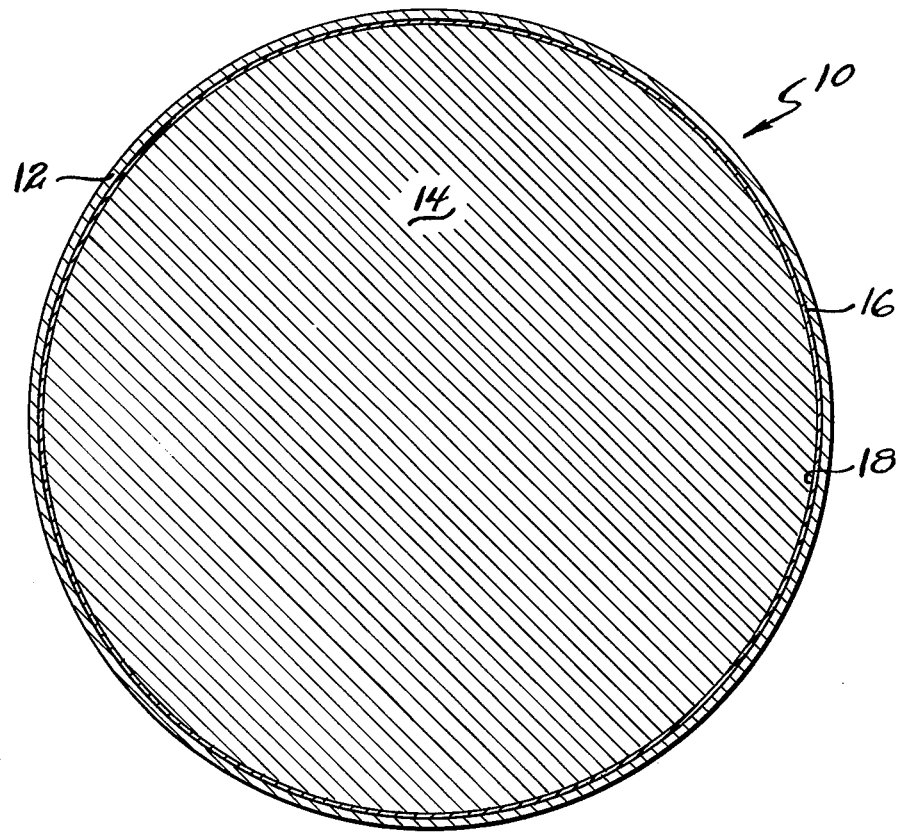

NUCLEAR REACTOR FUEL ELEMENT WITH VANADIUM GETTER ON CLADDING

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a nuclear reactor fuel element. More specifically this invention relates to a nuclear reactor fuel element having a layer of vanadium as an oxygen getter on the inside surface of the cladding. This invention also relates to a method for coating the inner surface of the cladding with a layer of oxygen gettering material.

A continuing supply of fissionable material is necessary to fuel future nuclear power plants to ensure adequate electrical power to meet the needs of the future. At present, power reactors are fueled with fissionable uranium-235 of which only a limited supply is available. To overcome this shortage of fissionable material, "breeder" power reactors are being developed, which produce more new fissionable material than is consumed in sustaining the reaction. For example, fissionable 233U or 239U is bred from fertile 232Th or 238U which is relatively abundant.

Because of their desirable physical characteristics, a reactor fuel of mixed plutonium and uranium oxides is being considered to fuel the breeder reactors presently under development. However, several problems have been discovered which are associated with the use of the mixed oxides. For example, it has been found that mixed oxide fuels are far more oxidizing than uranium oxide when used alone as a fuel. This oxidizing power, also known as the oxygen potential, is a measure of the driving force for the numerous reactions which take place in the fuel element during irradiation. Among other problems, this oxidizing potential provides the chemical driving force for corrosive attack of the fuel element cladding, and controls the vapor pressure of many fuel components, especially that of the uranium oxides and thus affects redistribution of uranium in the mixed oxide fuel matrix. The oxidizing potential also controls the chemical state of many fission products, whose interaction with the fuel contributes to fuel swelling, volatility and redistribution.

A particular problem has been the attack by the oxygen upon the fuel element cladding. Two types of cladding attack have been observed at the fuel-cladding interface. One is a general recession of the cladding thickness by a uniform oxidation of the stainless steel, known as matrix attack. The second is intergranular penetration by oxygen and fission products along grain boundaries in the cladding.

The fission products cesium, molybdenum, tellurium and iodine are found in the gap between the cladding and the fuel and are significant factors in influencing the degree and type of cladding attack. Fission-product cesium and molybdenum are found within the grain boundaries of the cladding. Chromium and manganese, which originate in the stainless steel matrix, are found in the fuel-cladding gap along with the fission products.

Cladding attack generally occurs at temperatures above 500° C. and is highly localized. Only rarely does cladding attack proceed in a continuous manner along an appreciable length of cladding. Matrix attack rarely exceeds depth of 2 mils, while grain boundary attack may penetrate the entire thickness of the cladding and appears to be mainly the function of the initial oxygen to metal ratio of the fuel.

A nuclear reactor fuel element which seeks to solve some of these problems is described in U.S. Pat. application Ser. No. 499,958, filed Aug. 23, 1974, and assigned to the common assignee. This fuel element contains a layer of chromium on the inner surface of the cladding as a protectant. Also described therein is a method for providing a coating of chromium on the cladding. However, this fuel element has not proven successful because of the inability to provide a layer of chromium on the surface which was sufficiently free of carbon impurities, since the carbon in the chromium will react with stainless steel cladding.

SUMMARY OF THE INVENTION

A nuclear reactor-fuel element has been prepared which eliminates many of the problems associated with the oxygen potential of the fuel material and the problems associated with the use of chromium in prior art fuel elements. The fuel element of this invention has a metallic cladding, a layer of vanadium as an oxygen getter on the inner surface of the cladding and a central core of an actinide oxide which may be fissionable or mixed fissionable and fertile fuel material. The oxygen released during fission reacts with the vanadium forming an oxide coating on the surface which protects the cladding by preventing the oxygen from reacting with and corroding the cladding material. Another advantage of the use of a layer of gettering material on the inner surface of the cladding is the formation of a ternary getter-oxygen-cesium compound on the surface of the getter material which acts as a lubricant to reduce fuel-cladding mechanical interaction that restricts the axial movement of the fuel within the cladding.

A thin coating of metal can be deposited on a section of the inner surface of a metal cladding tube by providing a portion of an electrical resistance heating wire with a layer of the coating metal about equal in length to the section to be coated, mounting the heating wire axially in the tube, that portion of the wire containing the layer of coating metal being positioned adjacent the section to be coated, forming an assembly, providing a vacuum for the assembly and passing sufficient electrical current through the heating wire to heat the layer of coating metal to vaporization temperature whereby the metal vaporizes from the surface of the layer and plates out on the inner surface of the tube adjacent the layer thus depositing a thin coating of metal on a section of the inner surface of the tube.

It is therefore one object of this invention to provide a nuclear reactor fuel element in which the cladding material is protected from corrosion by oxygen.

It is a further object of this invention to provide a nuclear reactor fuel element in which the inner surface of the cladding material is protected from corrosion by oxygen released from the fuel material during irradiation of the element.

It is still another object of the invention to provide a nuclear reactor fuel element in which the inner surface of the cladding contains a layer of vanadium as an oxygen getter.

Finally, it is the object of this invention to provide a method for providing a layer of vanadium as an oxygen getter on the inner surface of a tube of nuclear reactor fuel element cladding.

It is still a further object of the invention to provide a method for applying a thin layer of metal on the inner surface of small diameter tubes.

BRIEF DESCRIPTION OF THE DRAWING

The FIGURE is a cross-sectional view of the fuel element of the invention.

DETAILED DESCRIPTION OF THE INVENTION

Turning first to the figure, there is shown fuel element 10 having an outer cladding 12, a central fuel core 14 and a coating 16 of vanadium as an oxygen getter on the inner surface 18 of cladding 12.

The cladding may be of any suitable metal or alloy but, in general, an austenitic stainless steel such as 304 or 316 stainless is preferred. It is also preferred that the cladding be approximately 10 to 15 mils in thickness.

The oxygen gettering material which forms the layer on the inner surface of the cladding must be a material which will react chemically with the oxygen formed in the fuel element and yet not release the oxygen under the conditions at which the fuel element must operate to prevent the oxygen from reacting with the cladding material. In general, vanadium has been found to be the preferred gettering material. The layer of vanadium may range in thickness from approximately 0.25 to 1.0 mil.

The fuel core may be a single actinide compound or it may be a combination of actinide compounds such as for example plutonium oxide, uranium oxide or thorium oxide. The exact proportions of the actinide materials in the fuel core will be determined by the operating characteristics of the particular nuclear reactor involved and do not form any part of the present invention. The fuel core generally consists of pellets of small right circular cylinders, inserted in a tube of cladding material and sealed.

The inner surface of the cladding tube can be provided with a layer of vanadium by any method known to those skilled in the art. However, because of the small inner diameter of the cladding tube, it is difficult to provide an even layer of vanadium metal on the inner surface of the tube by usual methods.

One method found to be satisfactory is vapor deposition of the gettering metal on the inner surface of the cladding tube by thermally vaporizing the metal in a vacuum. A segment about 15 inches long on the inner surface of a type 316 stainless steel nuclear reactor fuel cladding tube was provided with a layer of vanadium. The tube was 36 inches long with an outer diameter of 0.33 inch and an inner diameter of 0.27 inch. An apparatus was assembled in which a 0.050 inch tungsten wire as a resistance heating wire was mounted axially in the cladding tube extending along the segment on which the layer was to be applied. The tungsten wire was previously wrapped with 0.01 inch diameter vanadium wire over a length of 14 inches and premelted by resistive heating in order to assure uniform vaporization. A tensile stress of 1000 to 1500 psi was applied to the tungsten wire to preserve the small clearances within the cladding tube. The heating wire and tube assembly was maintained in a vacuum of about $10^{-6}$ Torr by a two-stage mechanical pump and ion pump assembly.

Electrical power to the heating wire was supplied through copper wires 0.10 inch in diameter to which the tungsten wire was fastened by a slotted-collet arrangement. A current of 55 to 65 amps at 18 volts was supplied to the resistance wire by a step down transformer having a primary voltage of 220. The heating current was monitored and used to control the process. The vanadium was "flash" vaporized by applying the current to the heating wire for a period of time sufficient to heat the vanadium to vaporization temperature of about 2100 to 2300° C. for 1 or 2 seconds. Typically, the current was applied or flashed for about 10 seconds. The cladding was permitted to cool for at least 10 minutes between flashes to minimize loss to the cold worked properties of the cladding.

In all, twelve flashes were required to obtain the requisite thickness. The cladding tube was rotated about 120° C. after each four flashes to ensure uniformity in circumferential deposition. Thickness was calculated from the known weight loss (about 245 mg) of vanadium from the assembly and comparing these data with measurements from a metallographic picture and was found to be about 0.31 mils. Detailed explanation of a number of cross sections indicated that the circumferential and longitudinal variations in thickness of plating was less than 10%.

It will be understood that the invention is not to be limited to the details given herein but that it may be modified within the scope of the appended claims.

The embodiments of the invention in which an exclusive property or privilege is claimed are defined as follows:

1. A nuclear fuel element comprising:
    a tubular shaped outer metallic cladding having an inner surface and sealed ends, the cladding having walls 10 to 15 mils thick;
    a thin layer of vanadium as an oxygen getter bonded to the inner surface of the cladding to form an integral member; and
    a central core of actinide fuel material disposed within the cladding, said core being movable relative to the cladding.

2. The fuel element of claim 1 wherein the vanadium layer is 0.25 to 1.0 mil thick.

3. The fuel element of claim 2 wherein the cladding is stainless steel.

4. The fuel element of claim 3 wherein the actinide fuel material is selected from the group consisting of plutonium oxide, uranium oxide, plutonium oxide and uranium oxide, and plutonium oxide and thorium oxide.

5. The fuel element of claim 4 wherein the core of actinide fuel material consists of a plurality of right circular cylinders.

* * * * *